(12) United States Patent
Magen et al.

(10) Patent No.: US 9,399,272 B2
(45) Date of Patent: Jul. 26, 2016

(54) DUST EXTRACTION DEVICE FOR A ROTARY POWER TOOL

(71) Applicants: Lior Haviv, Ness-Ziyona (IL); Erez Magen, Rehovot (IL); Oren Haronyan, Hadera (IL)

(72) Inventors: Erez Magen, Rehovot (IL); Oren Haronyan, Hadera (IL)

(73) Assignee: Lior Haviv, Ness-Ziyona (IL)

( * ) Notice: Subject to any disclaimer, the term of this patent is extended or adjusted under 35 U.S.C. 154(b) by 32 days.

(21) Appl. No.: 14/402,741

(22) PCT Filed: May 22, 2013

(86) PCT No.: PCT/IL2013/050449
§ 371 (c)(1),
(2) Date: Nov. 21, 2014

(87) PCT Pub. No.: WO2013/175481
PCT Pub. Date: Nov. 28, 2013

(65) Prior Publication Data
US 2015/0110566 A1    Apr. 23, 2015

Related U.S. Application Data

(60) Provisional application No. 61/650,496, filed on May 23, 2012.

(51) Int. Cl.
*B23Q 11/00* (2006.01)
*B23B 45/00* (2006.01)

(52) U.S. Cl.
CPC .......... *B23Q 11/0046* (2013.01); *B23B 45/003* (2013.01); *B23B 2270/30* (2013.01);
(Continued)

(58) Field of Classification Search
CPC .......... B23B 2270/30; B23B 2270/62; B23Q 11/0042; B23Q 11/0046; B23Q 11/005; B23Q 11/0071; Y10T 408/50
See application file for complete search history.

(56) References Cited

U.S. PATENT DOCUMENTS 1,386,539 A * 8/1921 Strock .................... B24B 55/06
29/DIG. 79
2,344,143 A * 3/1944 Harding ................ B23B 51/104
408/186
(Continued)

FOREIGN PATENT DOCUMENTS

CH         353701 A  *  4/1961  ......... B23Q 11/0042
DE      2551537 A1  *  5/1977  ......... B23Q 11/0046
(Continued)

OTHER PUBLICATIONS

Machine translation of Swiss patent CH 353701 A. Apr. 30, 1961. issued to Allimann, G.*
(Continued)

*Primary Examiner* — Daniel Howell
*Assistant Examiner* — Chwen-Wei Su
(74) *Attorney, Agent, or Firm* — Peter A. Nieves; Sheehan Phinney Bass & Green, PA

(57) ABSTRACT

A dust extraction device (10) for a rotary power tool having an elongate rotating drill bit (1) for operating on a work surface includes a casing (12) having an inlet (13) and an outlet (14) and defining an interior cavity (15). A fan element (16) having a plurality of impellers (17) and a central hub (18) is adapted for rotation within and independent of the casing for inducing air flow within the casing from the inlet to the outlet when the fan element rotates, the hub being adapted for engaging the drill bit (11) in a manner that permits rotation of the hub as well as axial movement of the drill bit relative to the hub during rotation of the drill bit. Rotation of the drill bit results in air flow to remove debris from the work surface to the outlet without rotating the casing.

9 Claims, 3 Drawing Sheets

(52) U.S. Cl.
CPC ......... *B23B2270/62* (2013.01); *B23Q 11/0042* (2013.01); *Y02P 70/171* (2015.11); *Y10T 408/44* (2015.01); *Y10T 408/50* (2015.01)

(56) References Cited

U.S. PATENT DOCUMENTS

| | | | |
|---|---|---|---|
| 2,661,642 A * | 12/1953 | Marino | B23B 51/108 33/559 |
| 2,667,795 A * | 2/1954 | Bowen | B23B 51/108 408/223 |
| 3,063,312 A * | 11/1962 | Mueller | B23B 51/108 408/191 |
| 3,635,573 A * | 1/1972 | Halpern | B23B 51/108 408/186 |
| 3,850,254 A | 11/1974 | Hirdes | |
| 4,184,226 A | 1/1980 | Loevenich | |
| 4,251,171 A | 2/1981 | Brett | |
| 5,061,123 A | 10/1991 | Broussard | |
| 5,090,499 A | 2/1992 | Cuneo | |
| 5,605,421 A | 2/1997 | Hodgson | |
| 5,653,561 A | 8/1997 | May | |
| 5,772,367 A | 6/1998 | Daniel | |
| 6,102,631 A | 8/2000 | Nyari | |
| 6,514,131 B1 | 2/2003 | Reich et al. | |
| 6,848,985 B2 | 2/2005 | Lamprecht et al. | |
| 7,455,486 B2 | 11/2008 | Britz | |
| 7,497,886 B2 | 3/2009 | Walker | |
| 7,510,356 B2 | 3/2009 | Colon | |
| 2010/0047030 A1 * | 2/2010 | Eiserer | B23B 51/0453 408/204 |

FOREIGN PATENT DOCUMENTS

| | | | |
|---|---|---|---|
| DE | 3509199 A1 | 12/1987 | |
| DE | 10223072 A1 * | 5/2004 | ............. B23B 47/34 |
| DE | 202006008068 U1 | 7/2006 | |
| FR | 2763528 A1 * | 11/1998 | ......... B23Q 11/0046 |
| GB | 1569532 A * | 6/1980 | ......... B23Q 11/0046 |
| WO | 00/76721 A1 | 12/2000 | |

OTHER PUBLICATIONS

Machine translation of German patent, DE 2552537, May 26, 1977, issued to Haushalter, G.*

Machine translation of German patent document, DE 10223072, May 24, 2002, issued to Klein, R.*

* cited by examiner

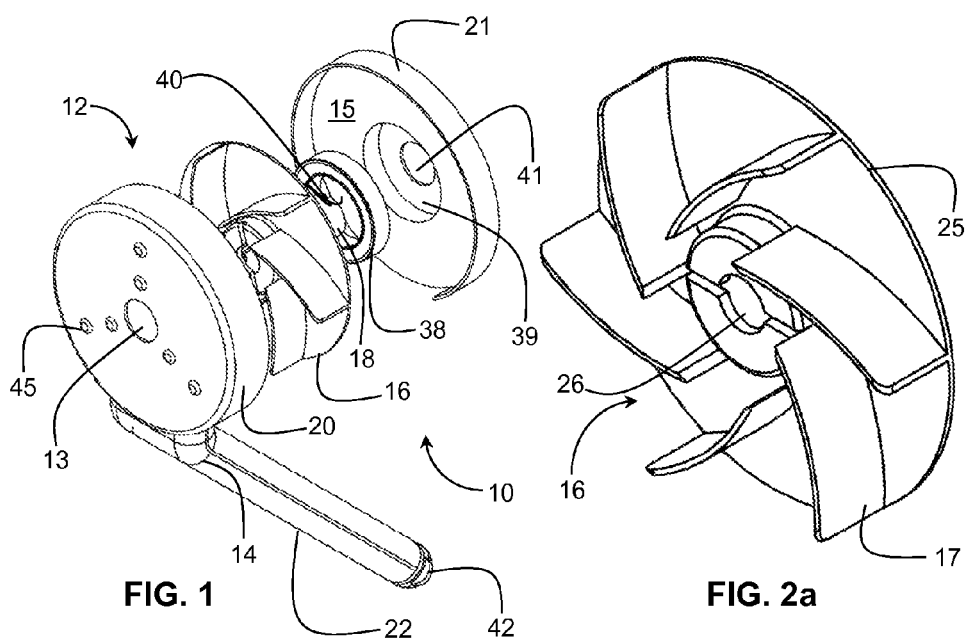
FIG. 1
FIG. 2a
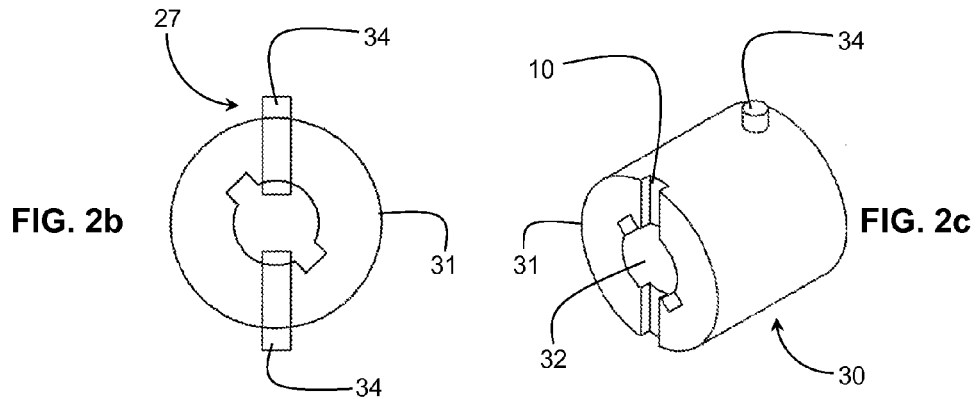
FIG. 2b
FIG. 2c
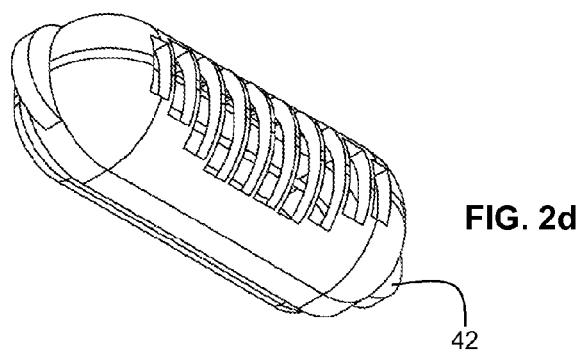
FIG. 2d

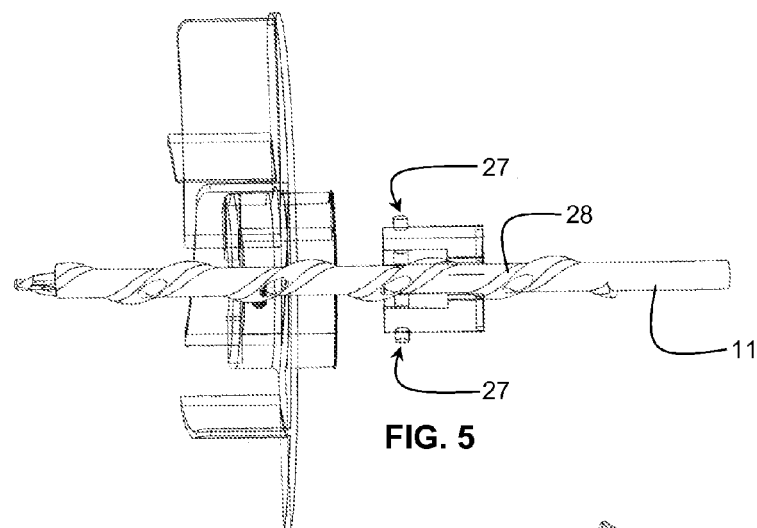
FIG. 5
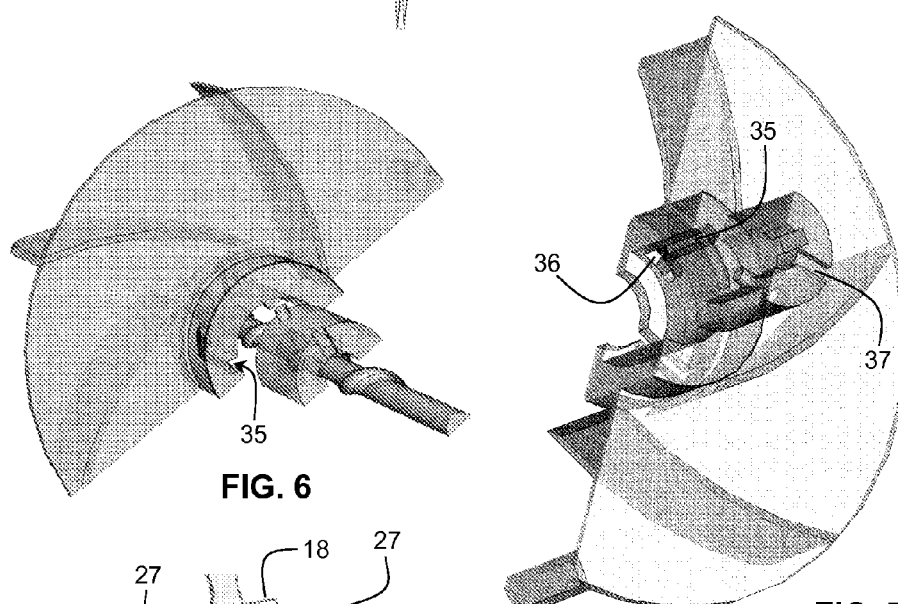
FIG. 6
FIG. 7
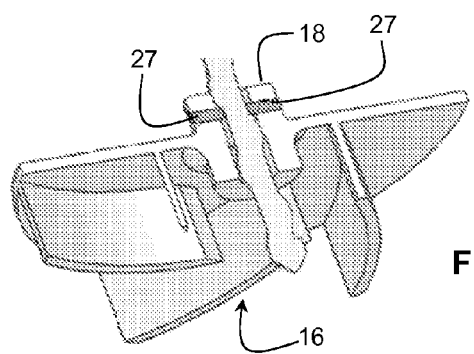
FIG. 8

DUST EXTRACTION DEVICE FOR A ROTARY POWER TOOL

FIELD OF THE INVENTION

The present invention relates to a dust extraction device for a rotating drill cutting tool.

BACKGROUND OF THE INVENTION

A drilling procedure is usually accompanied by small-sized particle residues extracted from the drilled material e.g. dust, sawdust, metal particles, etc. The vibrations associated with the operation of a power drill and the rotation of the cutting tool tend to vigorously disperse these residues all around the working environment, forcing the user to clean and remove the scattered dust and residues.

It is therefore known to provide either a dust collector, which is inherently of a passive type, or a dust extractor, which is inherently of an active type. Representative patents relating to dust collectors include U.S. Pat. Nos. 6,102,631; 4,251,171; 5,061,123 and 5,653,561. The devices described in these patents typically include a receptacle mounted on the drill bit having an open end that is held flush with a work surface being drilled. However, they oblige a hermetically sealed boundary with the drilled zone and are highly affected by gravity (i.e. drilling orientation), especially when detaching the drill from the drilled zone.

Dust-extraction type devices require suction for generating a flow of air from the drilling zone through the extraction device/apparatus. U.S. Pat. Nos. 5,605,421 and 4,184,226 disclose extractors that rely on external vacuum sources and are thus not standalone devices. U.S. Pat. Nos. 7,455,486 and 5,090,499 disclose devices having an independent, integrated electrically-operated suction element which extends up to the drilling zone and can be jointed externally to the drill body.

In order to obviate the need for a separate power source, it is known to utilize the drive of the power-tool motor as the driving force for the suction element. U.S. Pat. Nos. 6,848,985; 6,514,131 and 7,497,886 make use of a fan located internally to the power-tool housing and mounted on its motor drive-shaft. Some of these devices compel an inherent alteration in the power-tool design and manufacture and thus exclude their implementation on existing, standard power-tools.

U.S. Pat. No. 3,850,254 discloses a dust extractor drilling apparatus which includes a fan driven by a friction wheel operatively connected to the chuck of the drill. In this case the fan is not driven directly via the rotating chuck but rather via a transmission gear system. It also necessitates the use of a telescopic sleeve which surrounds the tip of the drilling tool.

U.S. Pat. No. 7,510,356 discloses a drill bit made of a shaft including a fan on the shaft and a related drill attachment for dust collection made of a handle. It excludes the use of existing, standard cutting-tools.

It would therefore be desirable to provide a dust extractor for a power drill that relies solely on the rotation of the drill bit and requires no coupling, directly or indirectly, to the drill body or to its motor and that is suitable for use for any drill bit.

U.S. Pat. No. 5,772,367 addresses this requirement and discloses an attachment for a rotating tool bit which provides air flow in the vicinity of the work area without the need for separate vacuum or compressed air supplies. The device is mounted on the shaft of the rotating tool bit and has a plurality of vanes which direct airflow through a cylindrical casing towards or away from the work area. A central aperture provides resilient mounting of the attachment to the tool bit whereby rotation of the tool bit induces rotation of the complete attachment.

The device described in U.S. Pat. No. 5,772,367 is standalone and requires no external source of power being mounted on the shank of a drill bit. But it also suffers from the following drawbacks. The device comprises a casing fixed to a base plate, which is integral with a central tube mounted on the drill bit and to which there are fixed a plurality of impellers that extend radially outward from the central tube. The impellers define radial channels around the periphery of the device and are shaped to suck in air and debris at a front end of the device, which is then discharged through the radial channels at the side edge of the device where it is collected by an annular filter.

Since the impellers are integral with the base plate, which itself is integral with the conical casing, rotation of the casing induces rotation of the impellers relative to the exterior of the casing. In other words, the complete attachment including the casing and the impellers rotates as a single unit, there being no relative rotation between the impellers and the side wall of the casing. This limits the suction efficiency of the device since once air is sucked into the front end of the conical casing, there does not appear to be a mechanism that directs the air and debris toward the annular filter other than the centrifugal force of the rotating casing.

Also, since the entire attachment including the casing and the impellers rotates as a single unit, there is generated a large torque/moment which potentially can impose a risk for the operator. Additionally, once the drill bit is rotating, the attachment cannot be handled so that the operator cannot change its location on the shaft of the tool bit. Also since the casing is rotating, the attachment cannot be brought too close to the workpiece because it will frictionally swivel and scratch the workpiece surrounding surface.

Furthermore, the device is frictionally gripped by the shank of the drill bit close to the chuck such that the air inlet is necessarily maintained remote from the workpiece and the suction applied by the rotating impellers is applied over a larger distance. The consequent reduction in suction is addressed by providing a conical casing at a front end of the device, which may be telescopically extended so that the tip of the casing is proximate to the workpiece. But while the conical casing may assist in channeling air through the device, it does not change the fact that the suction source is remote from the workpiece. Moreover, even when fully contracted the length of the casing extends along the cutting flute of the drill bit, which significantly reduces its effective length and limits the depth of penetration into the workpiece.

Finally, in order to be suitable for use with drills of different diameter, a central tube of the device is provided with a resilient elastomeric material that provides frictional engagement with the outer surface of drill bits of different diameters. By such means the central tube is gripped by the rear shank of the drill bit. This "one size fits all" is clearly a limitation since it is hardly practicable that the resilient material will be capable of accommodating drill bits across the complete range of the chuck, typically from less than 1 mm to 13 mm.

SUMMARY OF THE INVENTION

An objective of the present invention is to provide an improved dust extractor for a power drill that relies solely on the rotation of the drill bit and requires no coupling, directly or indirectly, to the drill body or to its motor.

According to the invention, there is provided a device for a rotary power tool having an elongate rotating drill bit for operating on a work surface, said device comprising:

a casing having an inlet and an outlet and defining an interior cavity, said inlet and outlet communicating with the interior cavity for permitting air flow into the interior space from the inlet to the outlet; and a fan element having a plurality of impellers and a central hub adapted for rotation within and independent of the casing for inducing air flow within the casing from the inlet to the outlet when the impeller rotates, said hub being adapted for engaging the drill bit in a manner that permits rotation of the hub as well as axial movement of the drill bit relative to the hub during rotation of the drill bit;

whereby rotation of the drill bit results in air flow to remove debris from the work surface to the outlet without rotating the casing.

The invention avoids the need to mount the impeller hub on the rear shank of the drill bit since it engages the drill bit in a manner that permits rotation of the hub as well as axial movement of the drill bit through the hub. Consequently, as the drill bit rotates, so too does the impeller thereby sucking in air and debris into the casing. But unlike the device disclosed in above-mentioned U.S. Pat. No. 5,772,367, the device according to the invention may move axially along the drill bit. Furthermore since the hub is able to rotate independent of the casing, the casing may be held manually close to, and typically in contact with, the work surface thus applying maximum suction without impeding the rotation of the impeller. The drill bit is then urged toward the work surface without requiring any movement of the casing. This is possibly because as the drill bit is advanced, it moves axially relative to the hub while the hub continues to rotate.

The impeller this acts as a fan like element that is clutched directly on the drill bit to be propelled and rotates concurrently with the drill bit. The extractor device casing, which encloses the fan element, is designed to be constrained of the fan rotational motion. In use, the device casing is preferably manually held by the operator. However, since it is stationary it could be fixed to the body of the power drill by a telescopic bracket or arm that allows the power drill and attached drill bit to be advanced toward the workpiece while maintaining the device casing in stationary contact with the workpiece. The relative rotational motion between the rotating fan element and the non-rotating casing generates an enhanced vacuum force for fluid flow through the device. In addition, the entire attachment (i.e. fan plus casing) is free to move linearly along the bit shaft independently of rotation of the bit and fan. This permits tight and full contact between the extraction element and the working plane prior to drilling and through the entire drilling process regardless of the bit penetration into the working plane.

Because the dust extractor is directly coupled to the rotation of the drilling element it is inherently active only when required. In addition, the close proximity of the device and its flow inlet opening to the work-surface during the entire drilling process increases the suction efficiency dramatically and eliminates the use of gap-compensating elements such as telescopic sleeves.

The resulting outcome of this design is a non-electrical power-free dust extracting device which is easily attached to existing drilling elements and requires no internal modifications for the drill in use.

The extractor device is compact, small, inexpensive, portable, green (no use of power), and versatile. It can be removed and applied easily on any drill bit of suitable gauge.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1 is an exploded pictorial view of a dust extractor device for a power drill according to a first embodiment of the invention;

FIGS. 2a to 2d are detailed views showing some of the components of the device depicted in FIG. 1;

FIG. 5 is a sectional view of the device showing operation of the adapter;

FIGS. 6 and 7 are exploded partial sections of the device showing connection of the adapter; and FIG. 8 is a partial section of a dust extractor according to a second embodiment.

DETAILED DESCRIPTION OF EMBODIMENTS

Figure 3:
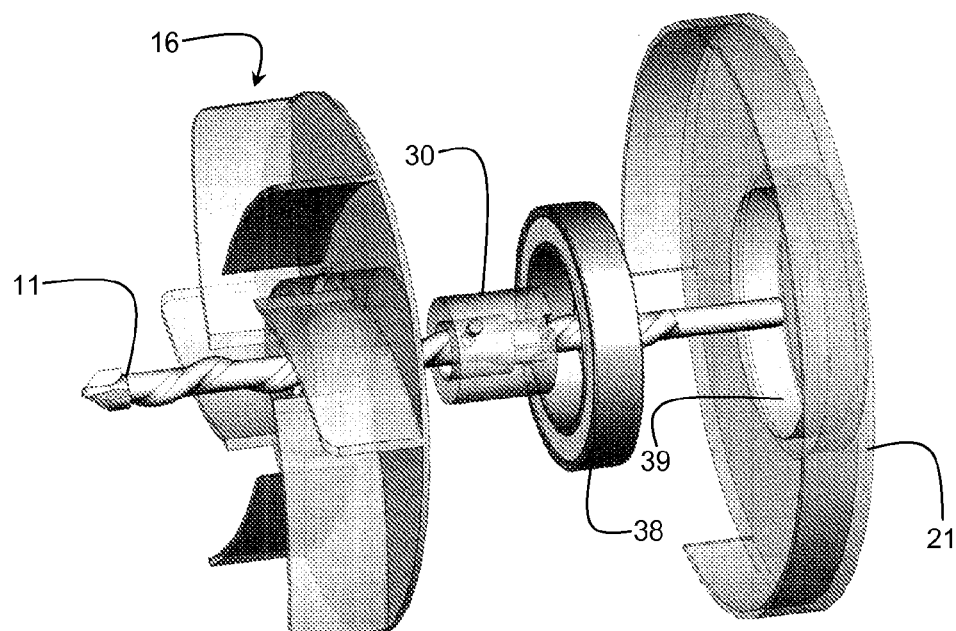
FIG. 3 is an exploded pictorial view showing details of internal components of the device.

In the following description of some embodiments, identical components that appear in more than one figure or that share similar functionality will be referenced by identical reference symbols.

With reference to the figures, there is shown a dust extraction device 10 for fitting directly on to an elongate drill bit 11 of a rotary power tool (not shown). The dust extraction device 10 comprises a casing 12 having an inlet 13 and an outlet 14 and defining an interior cavity 15, said inlet 13 and outlet 14 communicating with the interior cavity 15 for permitting air flow into the interior space from the inlet to the outlet. A fan element 16 has a plurality of impellers 17 radially attached to a central hub 18 that is adapted for rotation within and independent of the casing for inducing air flow within the casing from the inlet to the outlet when the fan element rotates. The hub 18 is adapted for engaging the drill bit 11 in a manner that permits rotation of the hub as well as axial movement the drill bit relative to the hub. Rotation of the drill bit thus induces rotation of the hub and the attached impeller and results in air flow to remove debris from the work surface to the outlet without rotating the casing.

The casing 12 is a split cylindrical casing having a front portion 20 and a back portion 21. The front portion 20 has an external face through a center of which is formed an aperture constituting the air inlet 13. An elongate dust funnel 22 projects from a side surface of the front portion 20 and serves as a dust collecting chamber and a handle. The fan element 16 comprises a disc plate 25 that supports the impellers 17 and a central tube constituting the hub 18. Although presented as radial, the fan impellers 17 can be modified to different shapes, sizes and densities to match higher efficiencies and different designs. The hub 18 harbors an axial bore 26 which accommodates the drill bit 11. The rotational motion of the drill bit 11 is transferred to the hub 18 and thus to the entire fan element 16. In this embodiment, rotation of the drill bit 11 is transferred to the fan element 16 via two substantially aligned pins 27 that extend radially into the spiral flute 28 of the drill bit.

Figure 4:
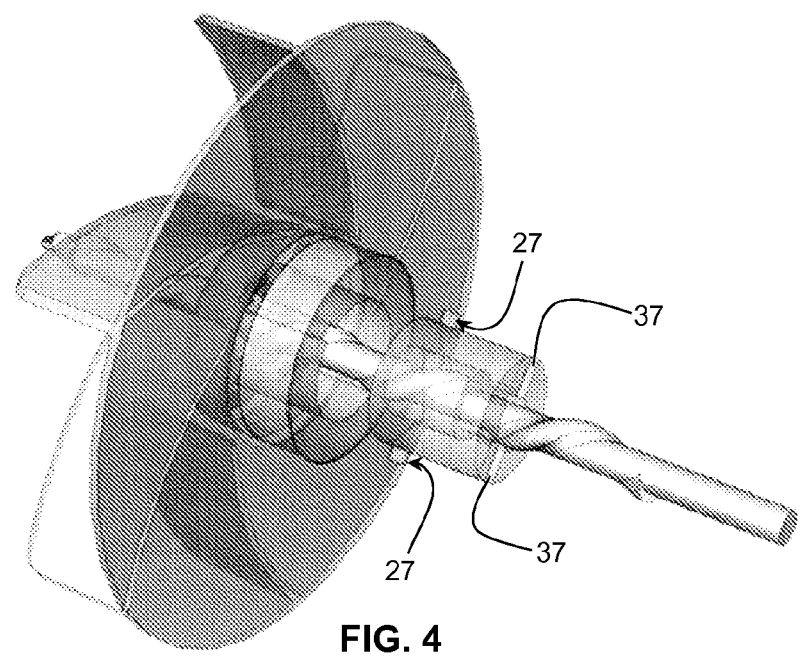
FIG. 4 is an exploded pictorial view showing an adapter for fitting the device to a drill bit of specific gauge.

In a first embodiment shown in FIGS. 3 to 7, the fan element 16 is articulated to the drill bit 11 by means of an adapter 30 details of which are shown in FIGS. 2b and 2c comprising a generally cylindrical body 31 having an axial bore 32 that is dimensioned to accommodate a drill bit of a specific gauge so as to allow unimpeded rotation of the drill bit within the adapter without undue slack. In practice it has been found that a given adapter is suitable for use with two drill bit sizes. Attempting to use too small a drill size would give rise to wobble. The pins 27 project radially through a side surface of the body 31 leaving a small overhang 34 that projects out of the side surface as best shown in FIG. 5. The pins 27 are sufficiently long so that they securely engage the spiral flute of the drill bit but are not so long that they reach the shank of the drill bit. During rotation of the drill bit, the internal surfaces of the spiral flutes press on the sides of the pins thereby inducing rotation of the adapter 30. The adapter 30 is removably attached to the fan element 16 such that rotation of the drill bit 11 rotates the fan element 16.

As best seen in FIGS. 5 and 6 the outwardly projection portions of the pins 27 are accommodated within axial grooves 35 formed in and extending partially along an internal side surface of the hub 18. The remote ends of the grooves 35 open to respective hidden arcuate recesses 36 (FIG. 7) so that when the pins 27 are pushed all the way to the ends of the grooves, they may then be rotated through a small angle into the recesses 36 whereupon they are retained by the keyed surfaces of the recesses. An end surface of the body 31 is provided with a slot 37 that allows the adapter to be turned by a key (not shown) for engaging or disengaging the pins within the recesses 36 and facilitating attachment and removal of the adapter.

The pins 11 penetrate sufficiently to engage the spiral flute of the drill bit while allowing the fan element 16 to slide and/or move freely and easily axially along the drill bit independent of the drill bit rotation. The pins 27 are preferably formed of a strong metal (e.g. stainless still) or any other strong material that is able to withstand the high torque and fast motion of the drill bit. Other embodiments may employ adjustable pins such as bolts, screws, springs and so on to allow the penetration depth of the pins to be adjusted. Likewise, while in the embodiment shown in FIGS. 3 to 7 the pins are part of an adapter, it should be noted that the adapter is optional. Thus, FIG. 8 shows an alternative embodiment where the pins 27 are mounted directly within hub of the fan element. It will also be understood that though pins 27 are described to impart the rotation of the drill bit to the hub while permitting allow axial movement of the drill bit, any other suitable mechanism that achieves the same result can be used to clutch rotational motion of the drill bit to the fan element. Where the device is used with drill bits formed of ferromagnetic material, such a mechanism might conceivably include an annular magnet coupled to the fan element that rotates with rotation of the drill bit, while allowing free axial movement thereof.

The front and back portions 20, 21 of the casing 12 are attached together to enclose the fan element 16. The diameter of the fan element is designed to be slightly smaller than the internal diameter of the casing 12 allowing it to rotate freely inside the casing while leaving a small circumferential clearance. In order to enable the fan element 16 to rotate independent of the casing, the fan element 16 is journalled to the back portion 21 of the casing via a bearing 38. The bearing 38 fits inside an annular recess 39 in the back portion 21 of the casing and has a central bore 40 that engages the outer surface of the hub 18. The back portion 21 includes a center hole 41 for allowing the drill bit to gain access therethrough. Suitable bearings can be plain bearings e.g. PTFE, rolling element bearings, magnetic bearings, fluid bearings, hinge joints, and so on.

The elongate dust funnel 22 is plugged at an open bottom end with a removable dust filter 42 shown in FIG. 2*d*, which is snap-fitted on to the end of the funnel 22 turning the funnel 22 into a dust collecting chamber. As noted previously, the dust funnel 22 may also serve as a handle of the dust extraction device to be held by the drill operator. Alternatively, the operator may prefer to hold the casing against the work surface directly.

Prior to drilling, the operator needs to slot the drill bit which is attached to the drill chuck through the hub 18 of the dust extraction device. The spiral flute of the drill bit allows the pins 27 to slide spirally through the hub by screw motion, causing the device to move backward towards the drill chuck. The operator can than locate the tip of the drill bit at a desired drilling location and slide the entire extractor device (which is held by his hand) against the work surface. The device 10 is designed to be slightly spaced by a few millimeters from the work surface by means of integrated spacers 45 protruding outwardly from the front portion 20 of the casing. The spacers 45 allow continuous air inflow from the work surface and enhance the suction efficiency.

As soon as the drill bit rotates the fan element starts to rotate concurrently inside the device casing. The relative rotational motion between the fan and the stationary casing generates air flow from the inlet 13 to the outlet 14. During the entire drilling process, the device 10 is pushed against the work surface, leaving a minimum gap of a few millimeters dictated by the height of the spacers 45 between the inlet 13 and the work surface. The gap remains constant even during penetration of the drill bit into the work surface and since the casing remains stationary, no peripheral damage is caused to the workpiece during operation of the drill. Furthermore, such an arrangement ensures that the fan element 16 is located only a few millimeters from the workpiece, thus applying maximum suction.

The invention being thus described in terms of embodiments and examples, it is to be understood that the description is not intended to be limiting, the scope of the invention being determined solely by the following claims.

The invention claimed is:

1. A dust extraction device for a rotary power tool having an elongate rotating drill bit for operating on a work surface, said device comprising:
   a casing having an inlet and an outlet and defining an interior cavity, said inlet and outlet communicating with the interior cavity for permitting air flow into the interior space from the inlet to the outlet; and
   a fan element having a plurality of impellers and a central hub adapted for rotation within and independent of the casing for inducing air flow within the casing from the inlet to the outlet when the fan element rotates;
   whereby rotation of the drill bit results in air flow to remove debris from the work surface to the outlet without rotating the casing;
   wherein:
   the hub is adapted for engaging the drill bit in a manner that permits rotation of the hub as well as axial movement of the drill bit relative to the hub during rotation of the drill bit;
   rotation of the drill bit is transferred to the fan element via two opposing aligned pins that extend radially into a spiral flute of the drill bit;
   the fan element is articulated to the drill bit by means of an adapter comprising a generally cylindrical body having an axial bore dimensioned to accommodate a drill bit so as to allow unimpeded rotation of the drill bit within the adapter without undue slack; and
   said pins projected radially through a side surface of the cylindrical body of said adapter leaving protruding portions that project out of a side surface of the body and are adapted to engage arcuate recesses in the hub of the fan element.

2. The device according to claim 1, wherein:

the casing is a split cylindrical casing having a front portion and a back portion, the inlet is formed in the front portion, the outlet is formed in a side surface of the front portion, and an elongate dust funnel projects from the side surface of the front portion in fluid connection with the outlet.

3. The device according to claim 2, wherein the elongate dust funnel serves as a handle for holding the device against a work surface to be drilled.

4. The device according to claim 2, wherein the elongate dust funnel is plugged at an open bottom end with a removable dust filter.

5. The device according to claim 1, wherein the fan element comprises a disc plate that supports the impellers.

6. The device according to claim 1, wherein an end surface of the body is provided with a slot that facilitates partial rotation of the adapter into or out of the arcuate recesses for attaching or removing the adapter.

7. The device according to claim 1, wherein the fan element has a diameter that is slightly smaller than an internal diameter of the casing so as to allow it to rotate freely inside the casing while leaving a small circumferential clearance.

8. The device according to claim 1, wherein the fan element is journalled to the casing via a bearing that is adapted for rotation within an annular recess inside the casing and has a central bore that engages an outer surface of the hub.

9. The device according to claim 1, including spacers protruding outwardly from a front surface of the casing for maintaining a gap between the work surface and the casing.

* * * * *